May 13, 1969   W. F. TAYLOR ET AL   3,443,886
EXHAUST GAS TREATMENT
Filed June 11, 1965
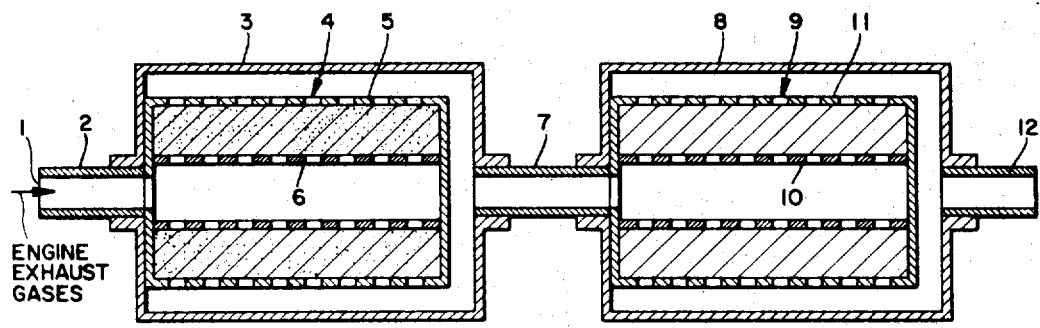
WILLIAM F. TAYLOR
JOHN H. SINFELT   INVENTORS
WILLIAM F. BILLER
BY Whelan, Chasan, Litton, Marx & Wright
PATENT ATTORNEYS

United States Patent Office 3,443,886
Patented May 13, 1969

3,443,886
EXHAUST GAS TREATMENT
William F. Taylor, Scotch Plains, John H. Sinfelt,
Berkeley Heights, and William F. Biller, East
Brunswick, N.J., assignors to Esso Research and
Engineering Company, a corporation of Delaware
Filed June 11, 1965, Ser. No. 463,188
Int. Cl. C01b 2/30; B01d 47/00
U.S. Cl. 23—2                                   5 Claims

ABSTRACT OF THE DISCLOSURE

Exhaust gases are contacted with a material comprising calcium, sodium and silica prior to contact with an equilibration catalyst in order to prevent or materially reduce the poisoning of the catalyst.

---

This invention is concerned with a treatment of exhaust gases from fuel combustion for removal of poisonous components found difficult to remove by known oxidation or reduction procedures. It deals with the preparation and use of sorptive and reactive solids, exemplified by a calcium-sodium-silicate composition adapted for rapid removal of poisonous components, such as sulfur dioxide, from automotive engine exhaust gas as it leaves the engine and passes into the catalytic reaction zone which can accomplish a further reaction of components, such as unburned hydrocarbons, carbon monoxide and nitrogen oxides, to realtively innocuous compounds, such as, $CH_4$, $H_2O$, $CO_2$, $N_2$ and $NH_3$.

With increasing need to control air pollution, a number of devices have been under development for treating exhaust gas. Most of these devices, such as an afterburner or catalytic oxidation device, require the use of an air pump and are not effective for removal of the oxides of sulfur and nitrogen. Also, they are difficult to install on older cars. Some devices are mainly filters which have low capacity for removing poisonous components. It is known that there are some suggestions on the sue of an alkaline earth oxide as in a filtering media but such suggestions have not included a teaching of how to make a material suitable for prolonged effectiveness under practical operating conditions as in treating exhaust effluent from automobile engines. These exhaust gases have to leave the engine exhaust ports at high velocity and at varying high temperatures. These exhaust gases contain a variety of components including $N_2$, $H_2O$, $CO_2$, CO, NO, $SO_2$, unburned hydrocarbons, lead compounds or organic halides and in some instances still other components. The components which are present that are noxious polluting components which are of most concern are the hydrocarbons higher boiling than methane and other organic gases, CO, nitrogen oxides, and $SO_2$. Although oxidation with added air decomposes hydrocarbons, organic compounds and CO to some extent, it does not achieve a removal of nitrogen and sulfur oxides.

An improved method for controlling the emission of hydrocarbons, organic compounds, CO and nitrogen oxides is a catalytic gas equillibration process, which avoids addition of air and which evolves little heat, thus eliminating the need of air pumps or expensive heat resistant materials in the equillibration device. The equillibration process may employ an acive Group VIII metal containing catalyst which can convert the higher hydrocarbon and organic components and the carbon monoxide to $CO_2$, $CH_4$, and $H_2$ by reaction with the $H_2O$ present under the exhaust gas temperature conditions and can convert nitrogen in NO by reaction with $H_2$ or CO to $N_2$. To be practical the catalyst should have a long life, e.g., in excess of about 300 hours, to amount to a year's service with an automobile when used in a practical manner. A preferred equillibration catalyst would contain notably nickel which is principally subject to poisoning by sulfur, and accordingly the removal of sulfur from the exhaust gas before the exhaust gas contacts the nickel catalyst is very important. The selective removal of the sulfur and some of the other noxious components, e.g., lead and halides, has to be effected without substantially changing the composition with respect to the $H_2O$, $O_2$, CO, and hydrocarbon components or their temperatures for attaining the proper subsequent equilibration reaction in which the CO and hydrocarbons are oxidized to $CO_2$ and nitrogen in NO is reduced.

The catalytic exhaust equilibration system is disclosed in U.S. application S.N. 325,024, filed Nov. 20, 1963. In this system the massive nickel catalyst having high nickel surface area, and prepared by interspersion with alumina and promotion by certain metal ions, e.g., barium, are very attractive on account of their low cost and high activity.

The present invention provides a combined system for maintaining high equilibration catalyst activity by having the equilibration catalyst reaction zone preceded by a preconditioning zone containing a guard material which chemically reacts with components of the exhaust gas that deactivate the equilibration catalyst. The guard material should have good physical strength, high capacity for reacting with and removing certain poisonous components, resistance to degradation by moisture, and other properties.

A number of factors have to be considered in the preparation of a suitable guard chamber material. The material must be sufficiently active to be effective for removing sulfur oxides from the exhaust at high space velocities, such as 500 v./v./hr. to 50,000 v./v./hr. (vols. gas per vol. of catalyst per hour) at temperatures in the range of 100° to 1500° F. to take into account variations of speed and temperature of an engine. The guard chamber for an automotive engine has limits on its volume and weight. The guard chamber material particles have to be sufficiently hard and strong so as not to form dust and not offer too much resistance to the flow of the gas at atmospheric pressure or slightly above atmospheric pressure. The cost of the materials is another factor.

Important and essential components of suitable guard chamber materials considering the fatcors mentioned are present in the combination of 45 to 90 parts by weight of calcium as CaO, 5 to 30 parts by weight of $SiO_2$, and 5 to 24 parts by weight of sodium as $Na_2O$. The preferred preconditioning material for use in the guard chamber contains calcium determined as CaO, $SiO_2$, and sodium determined as $Na_2O$ in the following weight ratios:

| | |
|---|---|
| CaO | 82–60 |
| $SiO_2$ | 8–20 |
| $Na_2O$ | 10–20 |

The ingredients supplying the calcium, sodium, and silica components are put together so that they are interspersed and combined or bonded together as in the simultaneous precipitation, calcining, and extrusion or pelleting steps.

The Ca-Na-silica solids have a high capacity for taking up the sulfur-containing components, which are mainly oxides of sulfur, and can be used as such without other ingredients. However, if desired, small amounts of other catalytic materials may be incorporated. The Ca-Na-silica solids perform their function without addition of air to the exhaust gas treated. Also, these solids may be mixed with spacing materials, e.g., asbestos fibers, without adding too much bulk.

In general, a mass or masses of preconditioning or guard material is to be arranged in a container or guard chamber which is attached to the exhaust system of the automotive engine in such a way as to insure that the exhaust gases have good contact with the preconditioning solid material but with minimum flow resistance. The preconditioning container is connected to the equilibration catalyst container or integrated with it.

The drawing illustrates schematically a combined preconditioning and equilibration catalyst system hookup.

Referring to the drawing, the exhaust gas leaving the engine enters the combined system at 1, flows through a duct 2 into the preconditioning container or guard chamber 3, in which is disposed a preconditioning solid cartridge 4 in the form of a perforated cylinder with a perforated outer cylinder 5 and a perforated interior tube 6 from which the gases entering are made to flow radially through the solids packed between the outer cylinder 5 and the tube 6. The cartridge can be connected by threads or friction engagement with the duct 2 so that it can be replaced when necessary. The preconditioning container 3 is connected by duct 7 to the container 8 in which is located a cartridge 9 that holds the equilibration catalyst between the perforated inlet tube 10 and the outer perforated cylinder 11. This cartridge is connected to the duct 7 so that it can be replaced when necessary. The equilibration container 8 has an outlet 12 for emitting the treated exhaust gas.

The containers and cartridges described may have various forms and can be constructed for convenient replacement. In principle the exhaust gas at a temperature of about 100° to 1500° F. leaving the engine exhaust port is made to flow into contact with the preconditioning material that serves to remove poisoning components, such as principally $SO_2$, and then to flow into contact with the equilibration catalyst for conversion of the higher hydrocarbon compounds, carbon monoxide and nitrogen oxides into the innocuous compounds.

It has been difficult to explain precisely how the practically effective, protective material functions in removing certain components from the exhaust gas. It does not function simply as an adsorptive device or filter because highly adsorptive materials including molecular sieves are not suitable. It does not function only as a base reacting with acidic components, because materials such as calcium oxide or materials high in sodium compound concentration are not suitable. Calcium oxide or calcium carbonate have limited capacity for reaction with $SO_2$ under exhaust gas conditions. Formulations having a high concentration of alkali metal are unsuitable on account of their low activity and tendency to form aqueous solutions with moisture in the exhaust gas. The alkaline earth compounds and alkali metal compounds do not by themselves make solids of proper physical characteristics for rapid reaction, low resistance to gas flow, and suitable strength. The preconditioning materials now found to be satisfactory are typified by a combination of a major amount of calcium with minor amounts of silica and sodium preferably in a combined form. The freshly prepared material, before use, consists of calcium oxide interspersed with sodium and calcium silicates or a mixed sodium-calcium silicate. The calcium and the alkali metal are expressed as being in the form of calcium oxide and sodium oxide although in the combined solids during the use of the material, they may be present as carbonates, sulfates, hydroxides and other compounds to various extents. The preconditioning solids of suitable activity and physical characteristics have been prepared by precipitating a calcium compound onto silica particles, e.g., kieselguhr, with an admixed alkali metal compound, washing some of the soluble salts from the precipitated solids if desired, then drying and calcining the solids.

The solids can be ground into fine powder after extensive drying, mixed with a small quantity of water to improve the extrusion characteristics, and then be extruded into shaped pellets or small rods of about ¼ to 1/32 inch diameter and 0.1 to 1.0 inch length. Alternately, the solids can be dried to a predetermined water level, and then be extruded without the addition of water. In this procedure the amount of washing can be controlled to remove mainly excess soluble alkali metal, since such metal in excess has adverse effects with respect to solubility in water and also on the activity of the guard. In the preparation of the satisfactory solids, the precipitation, drying and calcining bring about a combination of the ingredients so as to form a stronger structural unit which may be characterized as calcium-sodium-silicate in a broad sense.

The preferred method of preparation and tests demonstrating the effectiveness of preconditioning material are illustrated in the following examples.

EXAMPLE 1

A calcium-sodium-silica preconditioning zone material was prepared by adding 850 g. $Ca(NO_3)_2 \cdot 4H_2O$ and 50 g. of kieselguhr to 3 liters of water, and stirring well. To this slurry was added 360 g. of NaOH over approximately a one-hour period. After the addition of caustic was completed, the slurry was allowed to stir for an additional hour. The material was filtered, washed, and then dried overnight. It was then heated for 4 hours at 900° F. followed by 4 hours at 1250° F. The material was then crushed and screened to a 10/20 mesh size.

EXAMPLE 2

The preconditioning zone material prepared in Example 1 was tested with a typical exhaust gas blend having the composition: 70.5 mole percent $N_2$, 14% $H_2O$, 10.5% $CO_2$, 3% CO, 1.2% $H_2$, 0.6% $O_2$, 0.12% nitric oxide, 600 p.p.m. butane, 600 p.p.m. butene, and 900 p.p.m. $SO_2$. The test was made by charging 40 cc. of the material weighing 17.8 g. to a tubular heated vessel. The typical exhaust gas blend was passed over the material at 900° F. and a space velocity of 2,500 v./v./hr. for a 4-hour period. Analysis of the gas effluent during the run, and of the dumped preconditioning zone material after the intensified test run, indicated approximately all of the entering $SO_2$ was removed.

EXAMPLE 3

A calcium-sodium-silica preconditioning zone material was prepared in the same manner as in Example 1, except that after filtration and washing the material was dried and extruded into long cylindrical particles 1/16 inch in diameter and approximately ½ inch long. The material was then heated for 1 hour at 250° F. and 4 hours at 1250° F. In addition to the calcium and silica contained in the material, wet chemical analysis indicated it contained 8.1 wt. percent sodium.

EXAMPLE 4

The preconditioning zone material prepared in Example 3 was tested by charging approximate equal volumes of the preconditioning zone material and a nickel-refractory oxide-barium containing equilibration catalyst to a heated cylindrical vessel. The preconditioning zone material was located at the inlet of the vessel followed by the equilibration catalyst. The effluent from a single cylinder CFR engine burning an iso-octane fuel containing 120 p.p.m. sulfur was admitted to the cylindrical vessel. The engine was run at 1800 r.p.m. and an air/fuel ratio of 13.6 lbs./lb. The equilibration catalyst was first activated by reduction with $H_2$ and then engine effluent passed through the chamber at a rate of 10,000 v./v./hr., based on the volume v. of catalyst present, at 900° F. The efficiency of the combined system was determined by measuring the conversion of a typical hydrocarbon such as iso-octane and the carbon monoxide conversion. A comparison of the combined system results with the results of an identical test on the identical equilibration catalyst without the preconditioning zone, indicates that the combined system is superior.

TABLE I

| | Time (hours) | | | | |
|---|---|---|---|---|---|
| | Initial | 10 | 20 | 40 | 175 |
| Combined system: | | | | | |
| Percent CO conversion | 76 | 74 | 73 | 73 | 60 |
| Percent hydrocarbon conversion | 97 | 93 | 89 | 83 | 55 |
| Equilibration catalyst only. | | | | | |
| Percent CO conversion | 78 | 72 | 66 | 55 | |
| Percent hydrocarbon conversion | 99 | 85 | 70 | 40 | |

EXAMPLE 5

A calcium containing preconditioning zone material was prepared by adding 850 g. of $Ca(NO_3)_2 \cdot 4H_2O$, 12.5 g. of kieselguhr and 59.0 g. of $Na_2SiO_3 \cdot 9H_2O$ to 3 liters of water and stirring well. To this slurry was added 360 g. of NaOH over approximately a one-hour period. After the caustic addition was completed, the slurry was allowed to stir for an additional hour. The material was then filtered, and washed twice with water. The precipitate was then dried overnight at 230° F., and extruded into long cylindrical particles 1/16 inch in diameter and approximately ½ inch long. The extruded material was then heated for 1 hour at 250° F. and 4 hours at 1250° F. The finished material contained in addition to calcium and silica, 11.3 wt. percent sodium as measured by wet chemical analysis. Physical inspection of the particles indicated them to be exceptionally strong and resistant to breaking, crumbling and flaking.

EXAMPLE 6

The preconditioning zone material prepared in Example 5 was tested by charging approximately equal volumes of the preconditioning zone material and a nickel-refractory oxide-barium containing equilibration catalyst to a heated cylindrical vessel. The preconditioning zone material was located at the inlet of the vessel followed by the equilibration catalyst. The effluent from a single cylinder CFR engine burning an iso-octane fuel containing 120 p.p.m. of sulfur, 3 cc. tetraethyl lead per gallon, and lead scavengers to the extent of 1 theory of ethylene chloride and 0.5 theory of ethylene bromide, was admitted to the cylindrical vessel. The engine was run at 1800 r.p.m. and an air/fuel ratio of 13.6 lbs./lb.

The equilibration catalyst was first activated by reduction with $H_2$ and then engine effluent passed through the chamber at a rate of 10,000 v./v./hr. based on the volume of catalyst present, at 900° F. The efficiency of the system was determined by measuring the conversion of a typical hydrocarbon such as iso-octane in addition to the carbon monoxide and nitric oxide conversion.

TABLE II

| | Time (hours) | | | | |
|---|---|---|---|---|---|
| | Initial | 30 | 60 | 90 | 120 |
| Percent CO conversion | 73 | 73 | 65 | 50 | 45 |
| Percent hydrocarbon conversion | 98 | 90 | 82 | 50 | 39 |
| Percent nitric oxide conversion | 98 | 99 | 99 | 99 | 98 |

A comparison of the combined system exposed to the effluent of an engine burning a fuel containing sulfur, lead and lead scavengers, to that of a nickel equilibration catalyst without a preconditioning zone, exposed to the effluent of an engine burning a fuel containing only sulfur, indicates that the combined system is superior even in the presence of the added contaminants.

EXAMPLE 7

The Pharmacopeia of the United States, 16th edition, 1960, page 848, defines soda-lime as follows: "Soda-Lime is a mixture of calcium hydroxide and sodium or potassium hydroxide or both." A sample of a commercially available soda-lime was tested as a preconditioning zone material by charging 40 cc. of material weighing 25.8 g. to a tubular heated vessel. A typical exhaust gas blend having the composition 70.5% $N_2$, 14% $H_2O$, 10.5% $CO_2$, 3% CO, 1.2% $H_2$, 0.6% $O_2$, 0.12% nitric oxide, 600 p.p.m. butane, 600 p.p.m. butene, and 900 p.p.m. $SO_2$ was passed over the material at 900° F. and a space velocity of 2,500 v./v./hr. for a four-hour period. Analysis of the effluent gas indicated that at the end of 3.7 hours of the test the effluent gas contained 200 p.p.m. $SO_2$, whereas the preconditioning zone material of Examples 1 and 2, which was tested at conditions identical to the soda-lime test, showed no detectable $SO_2$ in the effluent at the end of 4 hours. This indicates that the preconditioning zone materials prepared according to the teachings of this invention are superior to commercial soda-lime.

A number of tests were conducted to determine the effect of varying the proportion of sodium ion in the calcium-sodium-silicate solids with regard to physical characteristics and relative activity for removal of $SO_2$ with increase in the weight percentage of sodium starting at 0 wt. percent and having increases of about 1 to 2% up to optimum amounts of above 8 wt. percent. It was observed that the resulting calcium-sodium-silicate changed from a tendency to form a very fine, loose powder to a tendency to form larger particles, e.g., 6–10 mesh, of greater hardness, i.e., resisting compression. In these solids the calcium ion was precipitated on kieselguhr using ammonium bicarbonate as a reagent and then drying and impregnating with sodium hydroxide before calcinating. A comparison of these solids with the preconditioning zone material prepared in Examples 1, 3, and 5 indicates that the simultaneous presence of the calcium, sodium and silica during the precipitation step results in a material superior to one in which the sodium is impregnated onto a preformed calcium-silica material.

The effects of increasing amounts of sodium ion in the calcium-sodium-silicate material are shown in the following summarized experimental results:

TABLE III.—EFFECT OF SODIUM CONTENT IN AN INTERSPERSED $CaO/Na_2O/SiO_2$ PRECONDITIONING ZONE MATERIAL [1]

| Wt. percent sodium by wet chemical analysis | Wt. percent sulfur picked up in bed [2] | | | | Relative [3] activity |
|---|---|---|---|---|---|
| | 1st ¼ Bed | 2nd ¼ Bed | 3rd ¼ Bed | Last ¼ Bed | |
| 4.4 | 3.90 | 3.13 | 1.31 | 1.03 | 63 |
| 6.3 | 3.29 | 1.04 | 0.85 | 0.57 | 73 |
| 11.3 | 4.05 | 2.60 | .02 | .02 | 100 |
| 15.2 | 2.30 | 3.21 | 0.80 | NA | 54 |

[1] Calcium-sodium-silica present simultaneously during the precipitation step.
[2] Full auto exhaust gas blend (70.5% $N_2$, 14% $H_2O$, 10.5% $CO_2$, 3% CO, 1.2% $H_2$, 0.6% $O_2$, 600 p.p.m. n-$C_4$, 600 p.p.m. $C_4$=, 0.12% nitric oxide) plus 900 p.p.m. $SO_2$. 2,500 v./v./hr., 900° F., standard 4 hour run.
[3] Based on relative half order rate constants for the removal of $SO_2$ as a function of volume of material bed.
NA—No analysis.

Experiments were carried out to determine the effects of substituting magnesium ion for the calcium ion, e.g., start with magnesium nitrate to precipitate magnesium ion on kieselguhr. The tests show that the calcium-sodium-silicate is far superior to the material made with magnesium instead of calcium. Additional tests were made to determine whether alumina could be used in place of the silica and the results of these tests showed that the silica is far better in the conditioning material. Potassium ion may be used in place of sodium or with sodium but with not as much effectiveness and with the disadvantage of greater cost. Some of the best results were obtained with the calcium precipitated on kieselguhr with sodium metasilicate. As illustrated in Example 5 this material used in a protective treatment zone or guard chamber in conjunction with a nickel equilibration catalyst treatment showed remarkably good catalyst activity maintenance. Additional tests also showed that the calcium-sodium-silica preparations are superior to preparations made by pilling a decomposible form of calcium such as calcium formate, and then calcining this material to form a calcium oxide material, or made by pilling and calcining a mixture of decomposible forms of calcium and magnesium such as calcium formate and magnesium carbonate. It is not intended that the invention be limited by any theory in the functioning of the protective material because all of the reactions or properties by which certain noxious components of the exhaust gas are held, are not fully understood.

The invention described is claimed as follows:

1. In an exhaust gas purification system having an equilibrium catalyst reaction zone wherein unburned hydrocarbons and carbon monoxide are converted to carbon dioxide, methane, and hydrogen, and nitrogen in nitrogen oxides is converted to nitrogen and $NH_3$, the improvement of preceding the equilibration catalyst zone by a preconditioning zone wherein the exhaust gas containing $N_2$, unburned hydrocarbons, $H_2O$, $CO_2$, CO, nitrogen oxides, $SO_2$, and other components in small amounts contacts a solid material containing 45 to 90 parts by weight of calcium calculated as CaO, 5 to 30 parts by weight of $SiO_2$ and 5 to 25 parts by weight of sodium calculated as $Na_2O$, said preconditioning material effecting removal of components including sulfur dioxide from the exhaust gas before the equilibrium reaction zone to maintain activity of the equilibrium catalyst.

2. A system as defined in claim 1, wherein the preconditioning material contains 45 to 90 parts by weight of calcium as CaO, about 5 to 30 parts by weight of $SiO_2$, and in the range of about 5 to 25 parts by weight of sodium as $Na_2O$.

3. A system for removing pollutants from an exhaust gas which comprises a container holding a preconditioning bed of solid material containing 45 to 90 parts by weight of calcium calculated as CaO, 5 to 30 parts by weight of $SiO_2$, and 5 to 25 parts by weight of sodium calculated as $Na_2O$ in the flow path of exhaust gas feed for removal of components including principally $SO_2$ in the feed, followed by a bed comprising a nickel catalyst which promotes the reaction of $H_2O$ with hydrocarbons and with CO to form $CO_2$, $CH_4$ and $H_2$ and which promotes reaction of nitrogen in NO to form $N_2$ in the exhaust gas from which $SO_2$ has been removed by the preconditioning bed.

4. A system as defined in claim 3, wherein the preconditioning zone bed contains 82 to 60 parts by weight of calcium as CaO and 8 to 20 parts by weight of $SiO_2$ and 10 to 20 parts by weight of sodium as $Na_2O$ in which the calcium, silica and sodium are in a combined form.

5. In a process of reducing and removing air pollutants including CO, unburned hydrocarbons, nitrogen oxides, and sulfur oxides from exhaust gases of fuel combustion with an equilibration catalyst which at temperatures in the range of 100° to 1500° F. promote oxidation of CO and unburned hydrocarbons to $CO_2$ by redistribution of oxygen available in the exhaust gases and reduction of nitrogen in nitrogen oxides to $N_2$, the improvement of treating the exhaust gases with Ca-Na-$SiO_2$ solids containing the Ca, Na, and $SiO_2$ bonded together in weight ratios of 45 to 90 parts Ca as CaO; 5 to 30 parts $SiO_2$; 5 to 25 parts Na as $Na_2O$ to remove substances including $SO_2$ which are injurious to the equilibration catalyst before the exhaust gases contact the equilibration catalyst.

References Cited

UNITED STATES PATENTS

| | | | |
|---|---|---|---|
| 1,716,479 | 6/1929 | Bilsky | 23—2 X |
| 2,423,689 | 7/1947 | Day | 252—192 |
| 2,470,214 | 5/1949 | Egan | 252—192 |
| 2,942,932 | 6/1960 | Elliot | 23—2 |
| 3,133,029 | 5/1964 | Hoekstra | 23—2 X |
| 3,228,746 | 1/1966 | Howk et al. | 23—2 |
| 3,397,034 | 8/1968 | Tulleners et al. | 23—2 |

OSCAR R. VERTIZ, *Primary Examiner.*

A. GREIF, *Assistant Examiner.*

U.S. Cl. X.R.

252—192, 454